US010010815B2

(12) United States Patent
Sturgess

(10) Patent No.: US 10,010,815 B2
(45) Date of Patent: Jul. 3, 2018

(54) FUEL FILTER OF AN INTERNAL COMBUSTION ENGINE AND HEATING SENSOR MODULE OF A FUEL FILTER

(71) Applicant: MANN+HUMMEL GMBH, Ludwigsburg (DE)

(72) Inventor: Christopher Marc Sturgess, Korntal (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 14/487,446

(22) Filed: Sep. 16, 2014

(65) Prior Publication Data

US 2015/0021246 A1    Jan. 22, 2015

Related U.S. Application Data

(63) Continuation of application No. PCT/EP2013/052467, filed on Feb. 7, 2013.

(30) Foreign Application Priority Data

Mar. 16, 2012 (DE) .......... 10 2012 005 206

(51) Int. Cl.
*B01D 35/00* (2006.01)
*F02M 37/22* (2006.01)
(Continued)

(52) U.S. Cl.
CPC ......... *B01D 35/005* (2013.01); *B01D 29/605* (2013.01); *B01D 29/608* (2013.01);
(Continued)

(58) Field of Classification Search
CPC ........ B01D 35/18; B01D 27/08; B01D 29/11; B01D 29/60; B01D 36/00; F02M 37/22; F02M 31/12; F02M 31/125
(Continued)

(56) References Cited

U.S. PATENT DOCUMENTS 3,235,084 A * 2/1966 King et al. .............. 210/149
4,477,345 A * 10/1984 Szlaga, Jr. .............. 210/130
(Continued)

FOREIGN PATENT DOCUMENTS

DE         68902315 T2    12/1992
DE    102009032036 A1     5/2010
(Continued)

*Primary Examiner* — Robert Clemente
*Assistant Examiner* — Akash Varma
(74) *Attorney, Agent, or Firm* — James Hasselbeck

(57) ABSTRACT

A fuel filter, in particular diesel fuel filter (10), of an internal combustion engine, in particular of a motor vehicle, and a heating sensor module (72) are described. A filter housing (14) has at least one inlet for the fuel to be cleaned and at least one outlet (32) for the cleaned fuel. A filter element (36) is arranged in the inner chamber (20) of the filter housing (14) in such a manner that it separates the at least one inlet from the at least one outlet (32). At least one heating unit (106) for heating the fuel, at least one temperature sensor (110) for detecting a temperature of the fuel and at least one water level sensor (90) for detecting a water level of water separated from the fuel in a water collection chamber (22) are integrated in the heating sensor module (72). At least one heating element (104) of the heating unit (106) is arranged in a heating chamber (102) which, with respect to a fuel flow (118, 120), is located outside the inner chamber (20) of the filter housing (14) between the inlet (74) and an unfiltered side of the filter element (36), and which, at the same time, is bounded by a module housing (80) of the heating sensor module (72).

13 Claims, 4 Drawing Sheets

(51) Int. Cl.
*B01D 29/60* (2006.01)
*B01D 35/18* (2006.01)
*B01D 36/00* (2006.01)
B01D 29/21 (2006.01)

(52) U.S. Cl.
CPC .......... *B01D 35/18* (2013.01); *B01D 36/005* (2013.01); *F02M 37/221* (2013.01); *F02M 37/223* (2013.01); B01D 29/21 (2013.01)

(58) Field of Classification Search
USPC ........................................................ 210/104
See application file for complete search history.

(56) References Cited

U.S. PATENT DOCUMENTS

| 5,547,572 | A * | 8/1996 | Stone ............................. 210/232 |
| 2008/0217231 | A1* | 9/2008 | Gama et al. .................. 210/184 |
| 2010/0000916 | A1* | 1/2010 | Eberle et al. ................ 210/96.2 |

FOREIGN PATENT DOCUMENTS

| EP | 1188468 | A1 | 7/1986 |
| EP | 0400223 | A1 | 12/1990 |

* cited by examiner

FUEL FILTER OF AN INTERNAL COMBUSTION ENGINE AND HEATING SENSOR MODULE OF A FUEL FILTER

CROSS-REFERENCE TO RELATED APPLICATIONS

This application is a bypass continuation application of international application No. PCT/EP2013/052467 having an international filing date of Feb. 7, 2013 and designating the United States, the international application claiming a priority date of Mar. 16, 2012, based on prior filed German patent application No. 10 2012 005 206.5, the entire contents of the aforesaid international application and the aforesaid German patent application being incorporated herein by reference.

TECHNICAL FIELD

The invention relates to a fuel filter, in particular diesel fuel filter, of an internal combustion engine, in particular of a motor vehicle which has at least one inlet for the fuel to be cleaned and at least one outlet for the cleaned fuel, and a filter element is arranged in the inner chamber thereof in such a manner that it separates the at least one inlet from the at least one outlet, having a heating unit for heating the fuel, having at least one temperature sensor for detecting a temperature of the fuel, and having at least one water level sensor for detecting a water level of water separated from the fuel in a water collection chamber, wherein the at least one heating unit, the at least one temperature sensor and the at least one water level sensor are integrated in a heating sensor module.

The invention further relates to a heating sensor module of a fuel filter, in particular diesel fuel filter, of an internal combustion engine, in particular of a motor vehicle, having at least one heating unit for heating the fuel, having at least one temperature sensor for detecting a temperature of the fuel, having at least one water level sensor for detecting a water level of water separated in a water collection chamber.

BACKGROUND

A filter system for fuel of an internal combustion engine of a motor vehicle is disclosed in EP 1 702 662 A1. The filter system has an electrical heating unit for heating the fuel. Further, the filter system has a filter housing with an inner chamber in which a filter element is arranged. The filter element separates an inlet for the fuel from an outlet. The heating unit for the liquid is removable and fitted to the filter housing in a leak proof manner. A board of the heating unit projects into an upstream region of the housing inner chamber which is bounded by the filter element. The board carries a plurality of heating elements of the heating unit. The board can be realized as an electronic card which comprises a substrate on which one or more heating tracks are printed. The substrate likewise comprises a self-regulation device, which, for example, is realized by means of a power transistor and a control circuit, the measuring system of which is a resistor with a negative temperature coefficient. In its lower section, the electronic card has two copper pads which are arranged in a water collection chamber. A water level sensor for the water level at the bottom of the housing is realized by the copper pads.

The invention is based on the object of designing a fuel filter and a heating sensor module of the kind mentioned in the introduction which is as compact as possible and by means of which the temperature of the fuel can be regulated as simply, efficiently and in as controlled a manner as possible.

SUMMARY OF THE INVENTION

According to the invention, this object is achieved in that at least one heating element of the heating unit is arranged in a heating chamber which, with respect to a fuel flow, is located outside the inner chamber of the filter housing between the inlet and an unfiltered side of the filter element, and which, at the same time, is bounded by a module housing of the heating sensor module.

According to the invention, therefore, a separate heating chamber is arranged upstream of a feed chamber of the filter housing on the unfiltered side. The feed chamber on the unfiltered side is located in the inner chamber of the filter housing. Depending on the flow direction of the filter element, the feed chamber can be arranged inside or outside the filter element and border its unfiltered side. The at least one heating element is located in the heating chamber. The fuel flowing to the filter housing passes through the heating chamber where it can be heated as uniformly as possible before it passes to the feed chamber on the unfiltered side of the filter element. Advantageously, the at least one heating element can be arranged in a main flow path of the fuel. This enables the fuel to flow along the at least one heating element and be efficiently heated thereby. As a result of the heating, the viscosity of the fuel can be reduced so that it has the required flowability before coming into contact with the filter element. This enables a pressure difference between the unfiltered side and the filtered side of the filter element to be reduced. Advantageously, all electrical and electronic components which are required for operating the heating unit, the temperature sensor and the water level sensor can be arranged in the heating sensor module. Advantageously, control electronics for the heating unit, for the at least one temperature sensor and/or for the at least one water level sensor can be integrated in the heating sensor module. In this way, the electrical and electronic components can easily be electrically isolated from the filter housing. Preferably, they can be electrically insulated with respect to the filter housing. The heating sensor module forms a closed functional unit. The heating sensor module can be separately prefabricated and calibrated. Electrical connections for the electrical and electronic components can be arranged directly on a module housing of the heating sensor module. The heating sensor module can be easily mounted on or in the filter housing. Advantageously, it can be releasably connected to the filter housing, in particular by means of a screw connection, a plug-in connection or a clip connection. It can also be permanently connected to the filter house. No separate assembly openings or through-openings in the filter housing are required for the heating device, the at least one temperature sensor or the at least one water level sensor or their cables. An assembly opening for the heating sensor module can easily be realized. The assembly opening can easily be sealed. Advantageously, the module housing can be sealed by means of a sealing device against the outside of the filter housing, in particular a mounting of the filter housing which, at the same time, bounds the heating chamber. The module housing and the filter housing can be made of different materials. Advantageously, the at least one temperature sensor can have a resistor with a negative temperature coefficient (NTC resistor). Advantageously, the at least one water level sensor can be arranged at the end of a rod of the heating sensor module which leads from the module housing through an appropriate opening through the inner chamber of the filter housing to a water collection chamber at the bottom of the filter housing. Advantageously, the opening for the rod can be sealed against the rod by means of a sealing ring. Advantageously, the sealing ring can be arranged in an appropriate sealing groove in the rod. Advantageously, the at least one inlet can be arranged on the filter housing. Advantageously, the at least one outlet can likewise be arranged on the filter housing. No inlets and/or outlets are therefore necessary on the heating sensor module. The heating sensor module can be connected to different types of filter housings. Conversely, a filter housing of one type can be equipped with different types of heating sensor modules. Advantageously, the filter element can be arranged in the filter housing so that it can be replaced. The filter housing can be openable for this purpose. Alternatively, the fuel filter can be realized as a replaceable filter element, with which the filter housing can only be replaced together with the filter element. Advantageously, the filter element can be a round filter element which is fitted coaxially with a filter axis. Advantageously, the filter element can have a filter medium which is closed around its circumference and is folded in a zigzag shape and has end disks at its face sides.

In an advantageous embodiment, the at least one temperature sensor can be arranged in the vicinity of the at least one inlet, preferably in the heating chamber, in particular, with regard to the flow path of the fuel in the heating chamber, closer to the at least one inlet than to an outlet opening of the heating chamber. In this way, the accuracy when determining the temperature of the incoming fuel can be improved. Based on the temperature determination, the heating unit can be actuated optimally and efficiently in order to set the fuel temperature as accurately as possible. Advantageously, the at least one temperature sensor can be arranged in the region of at least one heating element of the heating unit. However, it can also be arranged remotely from the at least one heating element. A plurality of temperature sensors can also be provided at different locations.

In a further advantageous embodiment, at least one heating element of the heating unit can be realized in sandwich construction. In doing so, in particular, two force-absorbing cover layers, between which a heating layer is arranged, can be provided. However, two heating layers which are arranged on both sides of a force-absorbing cover layer, can also be provided. More than a total of three layers can also be provided. By means of the sandwich construction, a large active surface for transferring heat, with which the fuel to be heated can come into contact, can be realized compared with the overall space required by the at least one heating element. In this way, a flow towards the at least one heating element and a transfer of heat from the at least one heating element to the fuel can be improved. In addition, the sandwich construction improves the design options, in particular a freedom of shape, for the at least one heating element. The at least one heating element can be placed in the heating chamber in a favorable position for transferring heat.

Advantageously, at least one heating element of the heating unit can have a structure through which the fuel to be heated can flow in a labyrinthine manner. In this way, a flow path, along which the fuel is in contact with the at least one heating element, can be increased in size while saving space. This enables the duration of thermal contact to be extended and the heat transfer to be improved.

In a further advantageous embodiment, the module housing of the heating sensor module can be electrically non-conducting. In this way, the electrical and electronic components in the heating sensor module can easily be electrically insulated with respect to the filter housing. Advantageously, the filter housing itself can be made of a conductive material, in particular a conductive plastic. Advantageously, the filter housing can therefore prevent electrical charging, as charging could result in a spark, for example, to fuel-carrying components which would mean a major fire hazard. Instead of a plastic, the filter housing can also be made of a different type of material, in particular a metal. The electrical components, in particular the heating unit, the temperature sensor and the water level sensor, can easily be insulated with respect to one another and with respect to the filter housing in the electrically non-conducting module housing of the heating sensor module.

Advantageously, the heating sensor module can preferably be clipped or placed into or onto a mounting of the filter housing from above in an installed state of the fuel filter. Furthermore, advantageously, the filter housing can be opened from underneath. In this way, the filter housing can be opened, in particular for maintenance purposes or for replacing the filter element, without having to disturb or even remove the heating sensor module at the same time. In addition, fitting the heating sensor module from above has the advantage that the seal of the heating sensor module against the filter housing can be simplified, as fuel entering the filter housing flows downwards due to gravity and the seal at the top is therefore subjected to less stress.

Advantageously, the heating sensor module can have at least one electrical connecting device for electrical supply cables and/or signal cables of the at least one heating unit, the at least one temperature sensor and the at least one water level sensor, in particular for electrical supply cables and/or signal cables of control electronics for the at least one heating unit, the at least one temperature sensor and/or the at least one water level sensor, which connecting device is arranged in the module housing. In this way, all electrical cables can be easily connected, preferably by means of a single connecting device, using appropriate connecting cables in particular to an engine controller of the internal combustion engine. A plurality of connecting devices can also be provided. Advantageously, the at least one connecting device can have a plug or a socket. The at least one connecting device can be designed such that it enables a rotation of the heating sensor module in or on the filter housing. The heating sensor module can therefore be positioned such that the at least one temperature sensor is arranged optimally in the heating chamber, preferably in the region of the at least one inlet. Advantageously, positioning aids, in particular positioning lugs or pins, can be provided on the module housing and on the filter housing for this purpose.

According to the invention, the technical object is further achieved with the heating sensor module in that, at the same time, a module housing of the heating sensor module is designed to bound a heating chamber outside an inner chamber of a filter housing of the fuel filter on an outer side of the filter housing, which, with respect to a fuel flow, is arranged between an inlet and an unfiltered side of a filter element of the fuel filter, and at least one heating element of the heating unit is arranged on the module housing such that it is located in the heating chamber when the heating sensor module is assembled. The advantages and features highlighted above in conjunction with the fuel filter according to the invention apply correspondingly to the heating sensor module according to the invention and its advantageous embodiments.

BRIEF DESCRIPTION OF THE DRAWINGS

Further advantages, features and details of the invention can be seen from the following description in which an exemplary embodiment of the invention is described in more detail with reference to the drawing. Expediently, the person skilled in the art will also consider the features disclosed in combination in the drawing, the description and the claims singly and combine them to form meaningful further combinations. In the drawing:

Identical components in the figures are given the same references.

DETAILED DESCRIPTION

Figure 1:
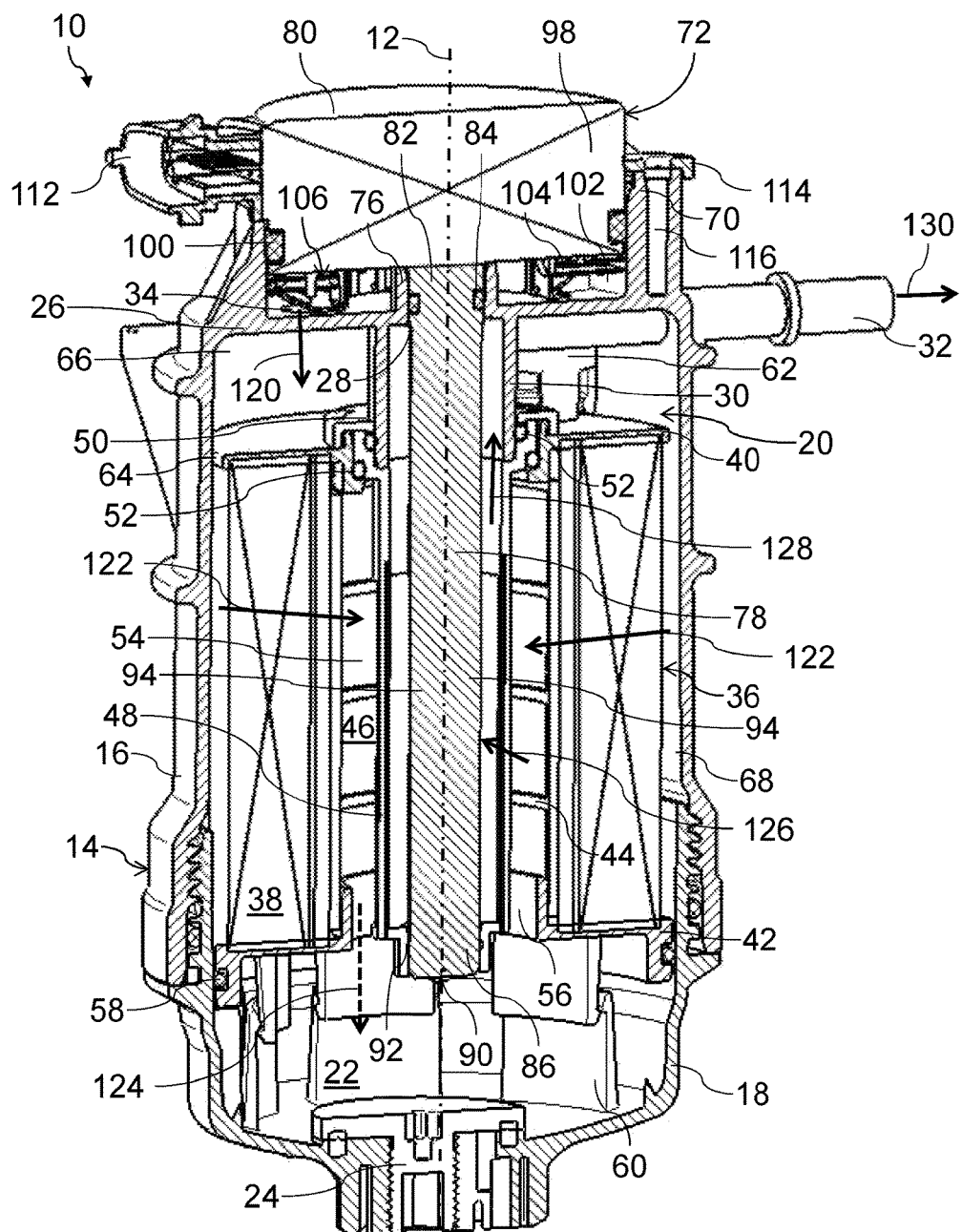
FIG. 1 shows schematically a longitudinal section through a filter axis of a fuel filter for diesel fuel with a heating sensor module.

A fuel filter 10 for diesel fuel of an internal combustion engine of a motor vehicle is shown in FIG. 1 in a longitudinal section through an imaginary filter axis 12.

The fuel filter 10 comprises a filter housing 14 which is made up of a filter bowl 16 and a filter cover 18 in an openable manner. The filter housing is made of an electrically conductive plastic. In the usual fitted position of the fuel filter 10, which is shown in FIG. 1, the open side of the filter bowl 16 points downwards. The filter cover 18 has an external thread which is screwed into a corresponding internal thread of the filter bowl 16. In this way, the filter cover 18 can be unscrewed from the filter bowl 16 so that an inner chamber 20 of the filter housing 14 is accessible from below.

The filter cover 18 is roughly cup-shaped and forms the bottom of the filter housing 14. A water collection chamber 22 for water separated from the fuel is located at the bottom of the filter cover 18. A drain device 24, which is of no further interest here, for the water which has collected in the water collection chamber 22 is arranged in the bottom of the filter cover 18.

On its face side facing away from the filter cover 18, the filter bowl 16 has a separating wall 26 which, to a certain extent, forms the upper base of the filter bowl 16. A penetration opening 28, which is coaxial with the filter axis 12, is located in the separating wall 26. On the inner side of the separating wall 26 facing the filter cover 18, the penetration opening 28 is encompassed by a cylindrical outlet connector 30. The outlet connector 30 is coaxial with the filter axis 12. It is connected in one piece to the separating wall 26. An outlet tube 32 feeds through a peripheral wall of the outlet connector 30. The outlet tube 32 feeds through the inner chamber 20 of the filter housing 14 and through the peripheral wall of the filter bowl 16. The outlet tube 32 opens out at one end into an inner chamber of the outlet connector 13. At its other end, the outlet tube 32 is connected outside the filter housing 14 to a fuel take-off line which is of no further interest here.

Radially outside the outlet connector 30 and the penetration opening 28, an inlet opening 34 for fuel feeds through the separating wall 26. The inlet opening 34 is shown particularly in FIG. 3.

A round filter element 36 is replaceably arranged in the filter housing 14. The round filter element 36 has a filter medium 38 which is closed around its circumference and is folded in a zigzag shape and is assembled coaxially with the filter axis 12. On its face sides, the filter medium 38 is connected in a leak proof manner to a connector-side end disk 40 at the top and to a bottom end disk 42 at the bottom. A skeleton-like supporting tube 44 extends coaxially with the filter axis 12 in an interior chamber 46 of the round filter element 36, which is encompassed by the filter medium 38, between the two end disks 40 and 42 and is permanently connected thereto in each case. The radially inner pleated edges of the filter medium 38 rest on a radially outer peripheral side of the supporting tube 44.

Further, a separator tube 48 for any water carried along with the fuel is arranged coaxially with the filter axis 12 in the inner chamber 46 of the round filter element 36. A peripheral wall of the separator tube 48 is made from a hydrophobic material which is permeable to the diesel fuel. The separator tube is located inside the supporting tube 44 at a radial distance therefrom. A peripheral separating gap 54, in which the water separated from the fuel can run downwards into the water collection chamber 22, is therefore realized between the radially outer peripheral side of the separator tube 48 and the radially inner peripheral side of the supporting tube 44. The separator tube extends from the connector-side end disk 40 to the bottom end disk 42. An inner chamber of the separator tube 48 merges into the inner chamber of the outlet connector 30.

The connector-side end disk 40 has a penetration opening 50 coaxial with the filter axis 12, through which the outlet connector 30 passes. The separator tube 48 has an enlarged cross section with which it connects to the outlet connector 30. The separator tube 48 is sealed by means of two O-ring seals 52 radially inwards against the outlet connector 30 and radially outwards against a cylindrical section of the connector-side end disk 40.

The bottom end disk 42 has an opening 56 coaxial with the filter axis 12, the diameter of which is somewhat smaller than the inside diameter of the supporting tube 44. The opening 56 is encompassed by a coaxial cylindrical section which is located on the inside of the bottom end disk 42 which faces towards the connector-side end disk 40. The opening 56 connects the separating gap 54 to the water collection chamber 22.

The radially outer peripheral side of the bottom end disk 40 rests tightly against the radially inner peripheral side of the filter cover 18. An O-ring seal 58 seals the bottom end disk 42 against the radially inner peripheral side of the filter cover 18.

A plurality of spacers 60, which are formed in one piece on the bottom of the filter cover 18, are supported against the outside of the bottom end disk 42 which faces away from the filter medium 38. A further spacer 62 is connected in one piece to the separating wall 26 and is supported against the outside of the connector-side end disk 40 which faces away from the filter medium 38. The round filter element 36 is therefore held in position axially with respect to the filter axis 12 by the spacers 60 and 62.

The outside diameter of the connector-side end disk 40 is less than the inside diameter of the filter bowl 60 at this point. In this way, a peripheral penetration gap 64, which connects an inlet chamber 66 in the upper region of the filter bowl 16 to an inlet ring chamber 68, is realized. The inlet ring chamber 68 encompasses the filter medium 38 radially outwardly on its unfiltered side. The inlet opening 34 opens out into the inlet chamber 66.

A receiving connector 70 for a heating sensor module 72 is arranged in one piece on the outside of the separating wall 26 which faces away from the inner chamber 20. The heating sensor module 72 is shown in detail in FIG. 4. The radially inner peripheral side of the receiving connector 70 is cylindrical and coaxial with the filter axis 12. The inside diameter of the receiving connector 70 is somewhat smaller than the inside diameter of the filter bowl 16.

Figure 2:
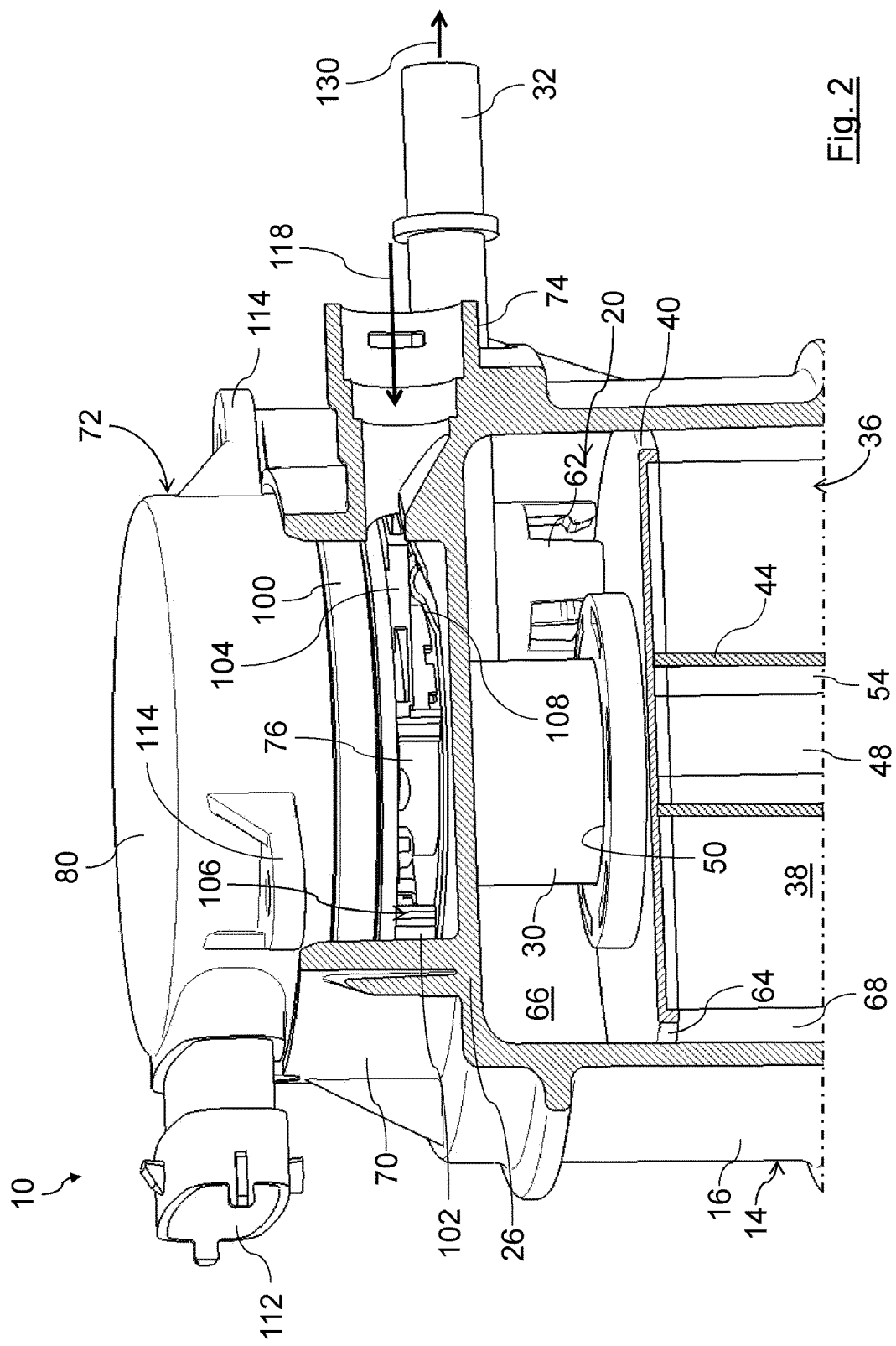
FIG. 2 shows schematically a detail view of the fuel filter in the region of a module housing of the heating sensor module, wherein the filter housing and a round filter element are cut in a sectional plane parallel to the filter axis through an inlet of the fuel filter.
Figure 3:
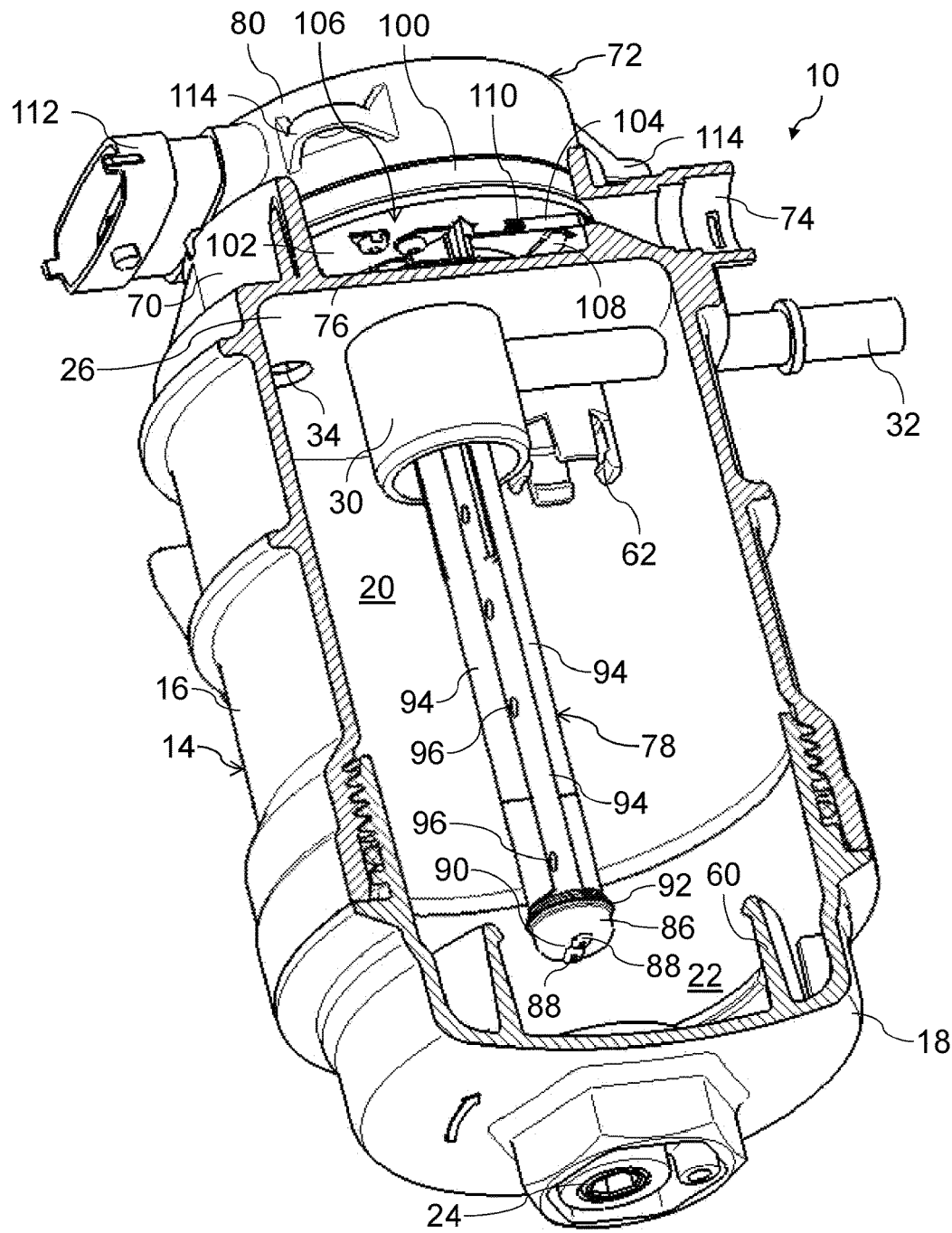
FIG. 3 shows schematically the fuel filter from FIGS. 1 and 2 without round filter element, wherein the filter housing is cut outside the filter axis.

An inlet connector 74 for fuel feeds through the peripheral wall of the receiving connector 70. The inlet connector 74 is shown in FIGS. 2 and 3. An imaginary axis of the inlet connector 74 runs in the direction of a secant to an imaginary peripheral circle of the receiving connector 70. In this way, the fuel which is fed in acquires a somewhat eddy-like flow characteristic inside the receiving connector 70.

A mounting connector 76 is arranged in one piece coaxially with the filter axis 12 on the outside of the separating wall 26 which faces away from the inner chamber 20. The inside diameter of the mounting connector 76 corresponds to the inside diameter of the penetration opening 28 and is less than the inside diameter of the outlet connector 30. The mounting connector 76 and the penetration opening 28 serve to receive a sensor rod 78 of the heating sensor module 72. The sensor rod 78 is connected at the bottom to a module housing 80 of the heating sensor module 72. The module housing 80 is made from an electrically non-conducting plastic. The sensor rod 78 has a circular cylindrical sealing section 82 at its end facing towards the module housing 80. The sealing section 82 plugs into the mounting connector 76. A sealing groove, in which an O-ring seal 84 is located, is arranged in the radially outer peripheral side of the sealing section 82. The O-ring seal 84 seals the sealing section 82 against the mounting support 76.

The sensor rod 78 extends downwards coaxially with the filter axis 12 into the water collection chamber 22. At its free end here, it has an approximately circular cylindrical sensor section 86, on the free face side of which two sensor elements 88 of a water level sensor 90 are arranged. The sensor elements 88 are shown particularly in FIGS. 3 and 4. On its radially outer peripheral side, the sensor section 86 carries an O-ring seal 92. The O-ring seal 92 is supported in a leak proof manner on a corresponding peripheral sealing surface on a radially inner peripheral side of the separator tube 48 in the region of its free end.

The sensor rod 78 has a cruciform profile between the sealing section 82 and the sensor section 86. A gap, through which the fuel can flow, in each case remains between the radially outer sides of the wings 94 and the radially inner peripheral side of the separator tube 48. Signal cables, which are not shown in FIGS. 1 to 4 and which connect the sensor elements 88 to control electronics 98 of the heating sensor module 72, run in the wings 94. Two of a total of four wings 94 of the sensor rod 78, which are arranged in a cruciform shape, have a plurality of penetration holes 96, which enable the signal cables to be held and positioned in the injection molding tool by means of pins during the injection process. The control electronics 98 is arranged in the module housing 80. For better clarity, in FIG. 1, the control electronics 98 is merely indicated by a cross.

A peripheral sealing groove with an O-ring seal 100, which seals the module housing 80 against the receiving connector 70, is arranged on the radially outer peripheral wall of the module housing 80. The module housing 80 is held at an axial distance from the separating wall 26 by means of mounting connector 70. In this way, a heating chamber 102, which is bounded by the peripheral wall of the receiving connector 70, the outside of the separating wall 26, the radially outer peripheral side of the mounting support 76 and an underside of the module housing 80 which faces the separating wall 26, is realized within the receiving connector 70.

Figure 4:
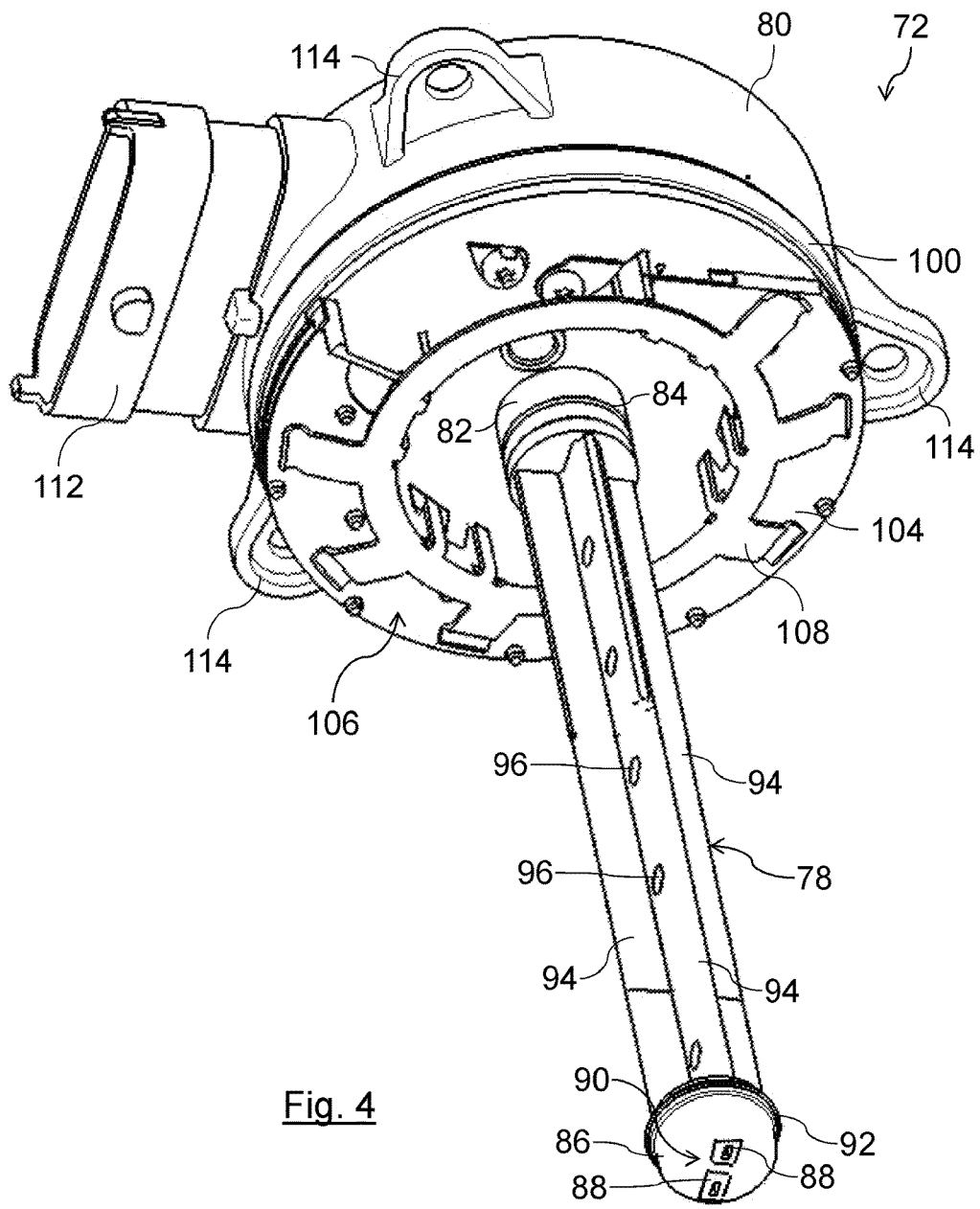
FIG. 4 shows schematically an isometric diagram of the heating sensor module of the fuel filter from FIGS. 1 to 3.

Heating elements 104 of a heating unit 106 of the heating sensor module 72 are located in the heating chamber 102. The heating unit 106 serves to heat the fuel in the heating chamber 102 before it passes to the unfiltered side of the filter medium 38. The heating elements 104 are electrically operated heating pads in sandwich construction. The heating pads are arranged such that they bound labyrinthine flow channels for the fuel. As shown in FIG. 4, the heating elements 104 are fixed to the bottom of the module housing 80 by means of a spring ring 108. Electrical contacts for operating the heating elements 104 feed through the underside of the module housing 80 to the control electronics 98.

Further, a temperature sensor 110 is arranged on the underside of the module housing 80. The temperature sensor 110 is indicated in FIG. 3. The temperature sensor 110 preferably comprises an electrical resistor with a negative temperature coefficient (NTC resistor). The temperature sensor 110 is located in the heating chamber 102 immediately adjacent to the inlet opening of the inlet connector 74. The inflowing fuel can there-fore flow directly to it. In this way, the temperature of the inflowing fuel can be determined directly. The temperature sensor 110 is connected to the control electronics 98 by means of electrical sensor cables (not shown) which feed through the underside of the module housing 80. The heating unit 106, the at least one heating element 104, the at least one temperature sensor 110 and the at least one water level sensor 90 are all integrated together with the heating sensor module 72 as a single component.

A plug-in device 112 for electrical connections which are connected to the control electronics 98 is arranged outside the receiving connector 70 in the peripheral wall of the module housing 80. A corresponding plug-in connector can be inserted into the plug-in devices 112, by means of which electrical supply cables and electrical signal cables can be connected, for example to an engine controller of the internal combustion engine.

In addition, a plurality of screw flanges 114 for connecting screws (not shown) are arranged on the radially outer peripheral side of the module housing 80. The connecting screws can be screwed into corresponding threaded holes 116 which are located radially outside the receiving connector 70 on the filter head 16. The heating sensor module 72 is releasably fixed to the filter housing 14 by means of the screw flanges 114, the threaded holes 116 and the screws.

When the internal combustion engine is running, the fuel to be cleaned flows through the inlet connector 74, shown by an arrow 118 in FIG. 2, into the heating chamber 102. In the heating chamber 102, the fuel first flows along a somewhat eddy-like flow path. The fuel is optimally distributed in the heating chamber 102 by the eddy-like flow path. The temperature of the inflowing fuel is detected by means of the temperature sensor 110 and is transmitted to the control electronics 98 via the appropriate signal cables. If the temperature of the fuel is less than a limiting temperature specified in the control electronics 98, the control electronics 98 controls the heating unit 106 so that the heating elements 104 are heated up. The fuel is fed along the labyrinthine flow paths on the heating elements. In doing so, the fuel is heated.

The heated fuel passes through the inlet opening 34, shown in FIG. 1 by an arrow 120, into the inlet chamber 66. From here, the fuel flows into the inlet ring chamber 68. The fuel flows through the filter medium 38 from its unfiltered side, radially outwards, to its filtered side, radially inwards, shown in FIG. 1 by arrows 122. The filtered fuel passes through the openings of the supporting tube 44 into the separating gap 54. The water contained in the fuel is separated at the radially outer peripheral side of the separator tube 48, and runs due to gravity, shown in FIG. 1 by a dashed arrow 124, into the water collection chamber 22 where it is collected.

The fuel which has been rid of water flows radially through the separator tube 48 from the outside to the inside, shown by an arrow 126, and passes upwards, shown by an arrow 128, into the inner chamber of the outlet connector 30. From here, the fuel flows into the outlet tube 32 and passes, as shown in FIG. 1 by an arrow 130, out of the filter housing 14 into the fuel take-off line which is not shown.

As soon as the water level of the water which has collected in the water collection chamber 22 reaches the sensor elements 88 of the water level sensor 90, this is transmitted to the control electronics 98 via the sensor cables. The control electronics 98 can then output an appropriate control signal to the engine controller. If the drain device 24 has an automatic sequence controller, this can be actuated by the engine controller to drain the water. Alternatively or in addition, an output element in the cockpit of the motor vehicle for outputting a visual and/or acoustic warning signal, for example, can be actuated by means of the engine controller to draw attention to the fact that the water collection chamber 22 must be emptied.

With the exemplary embodiment of a fuel filter 10 described above, the following modifications among others are possible:

The invention is not restricted to a fuel filter 10 for diesel fuel. Rather, it can also be used for other types of fuels. In addition, the invention can also be used outside motor vehicle technology, for example with industrial motors.

Instead of an electrically non-conducting plastic, the module housing 80 can also be made of a different, preferably electrically non-conducting material.

Instead of an electrically conducting plastic, the filter housing 14 can also be made of a different, preferably electrically conducting material, for example a metal. It can also be made of an electrically non-conducting material.

Instead of the NTC resistor, the temperature sensor 110 can also have a different temperature measuring element. The temperature sensor 110 can also be arranged further away from the inlet opening of the inlet connector 74. It can also be arranged outside the heating chamber 102. A plurality of temperature sensors 110 can also be provided.

Instead of the heating element 104 in sandwich construction, a different kind of heating element can also be provided. A plurality of heating elements can also be provided.

Instead of the labyrinthine flow characteristic, a different flow characteristic can also be preset with the heating element 104.

Instead of the water level sensor 90 with the sensor elements 88, a different type of water level sensor can also be provided. A plurality of water level sensors can also be provided. Instead of at the end of the sensor rod 78, the water level sensor 90 can also be arranged at a different point in the water collection chamber 23.

Instead of a round cross section, the radially inner peripheral side of the receiving connector 70 and the radially outer peripheral side of the module housing 80 can also have a different type of cross section, for example an oval cross section. An angular cross section can also be provided. The radially inner peripheral side of the receiving connector 70 and the radially outer peripheral side of the module housing 80 can also be conical.

Instead of by means of the screw flanges 140, the connecting screws and the threaded holes 160, the heating sensor module 72 can also be releasably connected to the filter housing 14 in other ways, for example by means of a clip connector, a different type of screw connector or a bayonet-like connector. Instead of being releasably connected to the filter housing 14, the heating sensor module 72 can also be permanently connected, for example glued, pressed or welded.

Instead of being plugged into the receiving connector 70, the module housing 80 can also be placed on or plugged onto the receiving connector 70.

Instead of radially from the outside to the inside, flow through the round filter element 36 can also take place in the opposite direction. In this case, the inlet opening 34 and the outlet tube 32 with the appropriate fluid-carrying connections are modified accordingly.

More than one inlet opening 34 and/or one outlet tube 32 can also be provided.

Instead of the round filter element 36, a different type of filter element, for example a filter element with an oval or angular cross section or with a conical shape, can also be provided.

Instead of the filter medium 38 which is folded in a zigzag shape, a different type of peripherally closed filter medium can also be provided.

Instead of the separator tube 48, a different type of separating device for separating water can also be provided.

What is claimed is:

1. A fuel filter of an internal combustion engine, comprising:
   a filter housing (14) having an inner chamber enclosed by the housing, the housing including:
     a unitary one-piece plastic cup-shaped filter bowl (16) forming a first portion of the filter housing;
     a cup-shaped filter cover (18) forming a second portion of the filter housing;
     wherein the cup-shaped filter bowl and cup-shaped filter cover having mating threads that engage to close the filter housing to define and enclose the inner chamber;
     wherein axial, as used in this claim, is a direction parallel to an elongation direction of an elongated sensor rod installed in the filter housing; wherein radial, as used in this claim, is a direction traverse to the axial direction;
     wherein the cup-shaped filter bowl (16) is formed in it's entirety as a one piece as a single unitary molded plastic component having: a circumferentially closed outer wall, a top housing wall (26) forming an upper base of the unitary plastic cup-shaped filter bowl with a penetration opening (28) extending through the top housing wall of the filter bowl (26) from an exterior of the filter housing into the inner chamber, the top housing wall (26) of the cup-shaped filter bowl (16) forming an annular wall receiving connector on the directly on the exterior of the filter housing directly on the top housing wall (26), the annular wall receiving connector arranged on an exterior of the filter housing and projecting axially outwardly away from the filter housing, the annular wall receiving connector surrounding the penetration opening (28);

a filter element (36) arranged within the inner chamber (20) of the filter housing, the filter element having a hollow interior and a top end disk (40) and a bottom end disk (42);

a heating sensor module (72) arranged within an interior of the annular wall receiving connector (70) and extending axially outwardly from the annular wall receiving connector to an exterior of the filter housing, so as to removable from the filter housing through the interior of the annular wall receiving connector (70) without disassembling the filter housing;

the heating sensor module having an axially elongated sensor rod (78) extending through the penetration opening (28) of the top housing wall (26) and into the inner chamber (20) and then continuing through a central opening of the top end disk (40) of the filter element and into the hollow interior of the filter element;

at least one water level sensor (90) arranged on a lower axial end of the axially elongated sensor rod (78), the at least one water level sensor (90) detecting water level in a water collection chamber arranged below the bottom end disk of the filter element;

the heating sensor module having a heating unit (106) having at least one heating element (104) arranged within the annular wall receiving connector at the exterior of the filter housing;

wherein the heating sensor module has an seal ring that, when the heating sensor module is installed, radially seals from the heating sensor module to the annular wall receiving connector to sealably close the annular wall receiving connector;

at least one temperature sensor (110) sensing fuel temperature of fuel in the annular wall receiving connector;

wherein the heating sensor module (72) having the axially elongated sensor rod (78), the heating element (104), the at least one temperature sensor (110) and the at least one water level sensor (90) are all integrated together with the heating sensor module (72) as a single component, separate from and installable into the filter housing (14) through the interior of the annular wall receiving connector (70) at an exterior of the filter housing without disassembling the filter housing.

2. The fuel filter as claimed in claim 1, wherein the at least one heating element (104) of the heating unit (106) having sandwich construction.

3. The fuel filter as claimed in claim 1, wherein the at least one heating element (104) of the heating unit (106) has a structure through which the fuel to be heated flows in a labyrinthine manner.

4. The fuel filter as claimed in claim 1, wherein the module housing (80) of the heating sensor module (72) is electrically non-conducting.

5. The fuel filter as claimed in claim 1, wherein the heating sensor module (72) is installable on the module housing from an exterior of the filter housing while the filter housing is in a closed state in which the filter element remains enclosed within the filter housing during installation.

6. The fuel filter as claimed in claim 1, wherein the heating sensor module (72) includes an electrical connecting device (112) having electrical connections for electrically connecting electrical power supply cables and/or signal cables to the at least one heating unit (106);

wherein the heating sensor module (72) includes control electronics (98);

the electrical connecting device electrically connecting electrical supply cables and/or signal cables for the control electronics (98) for the at least one heating unit (106) to the at least one temperature sensor (110) and/or the at least one water level sensor (90).

7. A filter element of a fuel filter of an internal combustion engine arranged in the filter housing as claimed in claim 1.

8. The fuel filter as claimed in claim 1, wherein the heating sensor module (72) is connected to the filter housing (14) by any of: an adhesive, a screw connection, pressed into the annular wall receiving connector (70) or welded to the filter housing.

9. The fuel filter as claimed in claim 1, wherein the at least one water level sensor (90) of the axially elongated sensor rod (78) is arranged outside of the open interior of the filter element at proximate to the water collection chamber.

10. The fuel filter as claimed in claim 1, wherein the heating sensor module is arranged at and visible on the exterior of the fuel filter during operation.

11. The heating sensor module according to claim 8, wherein the elongated sensor rod (78) includes a plurality of radially outwardly extending wings (94), the plurality of wings extending axially between the first (82) and second (86) axial ends of the elongated sensor rod (78).

12. A heating sensor module (72) for installation in a fuel filter of an internal combustion engine, the heating sensor module comprising:

an axially elongated sensor rod (78);

wherein axial, as used in this claim, is a direction parallel to an elongation direction of the elongated sensor rod; wherein radial, as used in this claim, is a direction traverse to the axial direction;

a module housing (80) having a radially outer surface;

wherein the elongated sensor rod has a first axial end secured onto the module housing (80), the axially elongated sensor rod extending axially outwardly away from the module housing (80), the elongated sensor rod adapted to be received, through a penetration opening (28) in a housing wall of the fuel filter into an interior of the fuel filter;

at least one water level sensor (90) arranged on an opposite second axial end of the axially elongated sensor rod (78), the at least one water level sensor (90) configured to detect water level in a water collection chamber of the fuel filter; and at least one temperature sensor (110) sensing fuel temperature of fuel;

wherein the heating sensor module (72) having the module housing (80), axially elongated sensor rod (78), the at least one temperature sensor (110), and the at least one water level sensor (90) are all integrated together as a single component, separate from and installable into the fuel filter from an exterior of the fuel filter.

13. The heating sensor module according to claim 12, further comprising:

an annular seal ring arranged on a radially outer surface of the module housing (80) and circumferentially surrounding the module housing (80).

* * * * *